(12) United States Patent
Ivansson et al.

(10) Patent No.: US 7,937,191 B2
(45) Date of Patent: May 3, 2011

(54) TERMINATION SECURED ROUTE PLANNING

(75) Inventors: Johan Ivansson, Linköping (SE); Mathias Tyskeng, Linköping (SE)

(73) Assignee: SAAB AB, Linköping (SE)

( * ) Notice: Subject to any disclaimer, the term of this patent is extended or adjusted under 35 U.S.C. 154(b) by 973 days.

(21) Appl. No.: 11/822,037

(22) Filed: Jul. 2, 2007

(65) Prior Publication Data

US 2008/0147309 A1 Jun. 19, 2008

(30) Foreign Application Priority Data

Jun. 30, 2006 (EP) .................................... 06116479

(51) Int. Cl.
*G05D 1/04* (2006.01)

(52) U.S. Cl. ............... 701/4; 701/3; 701/200; 701/202; 340/970

(58) Field of Classification Search .............. 701/3, 4, 701/11, 23, 120, 200, 202, 208; 340/951, 340/967, 970, 974, 976, 977
See application file for complete search history.

(56) References Cited

U.S. PATENT DOCUMENTS

| | | | | |
|---|---|---|---|---|
| 5,142,480 A * | 8/1992 | Morrow | ........................ | 701/219 |
| 5,361,212 A * | 11/1994 | Class et al. | ..................... | 701/16 |
| 6,804,585 B2 * | 10/2004 | Humbard et al. | ................ | 701/3 |
| 7,076,367 B2 * | 7/2006 | Du | ................................ | 701/301 |
| 7,158,877 B2 * | 1/2007 | Carlsson et al. | .............. | 701/206 |
| 7,167,782 B2 * | 1/2007 | Humbard et al. | ................. | 701/3 |
| 7,194,353 B1 * | 3/2007 | Baldwin et al. | ............... | 701/206 |
| 7,512,462 B2 * | 3/2009 | Nichols et al. | ..................... | 701/3 |
| 2004/0193334 A1 * | 9/2004 | Carlsson et al. | .................. | 701/9 |
| 2007/0043482 A1 * | 2/2007 | Aimar | .............................. | 701/4 |
| 2007/0138345 A1 * | 6/2007 | Shuster | ........................ | 244/186 |

FOREIGN PATENT DOCUMENTS

| | | |
|---|---|---|
| DE | 3124553 A1 | 3/1983 |
| EP | 1462898 A2 | 9/2004 |
| EP | 1657611 A1 | 5/2006 |
| WO | WO-00/31564 A1 | 6/2000 |

OTHER PUBLICATIONS

European Search Report—Dec. 29, 2006.

\* cited by examiner

*Primary Examiner* — Thomas G Black
*Assistant Examiner* — Ce Li
(74) *Attorney, Agent, or Firm* — Venable LLP; Eric J. Franklin

(57) ABSTRACT

A method of forming a safe termination operation volume, and an aircraft provided with a system using such a volume to plan a flight route and/or an emergency route. The volume indicates the lowest allowable flight altitude to achieve a glide path of a vehicle to a termination point of an area of interest, wherein non allowable fly zones are taken into consideration by adding flight altitude to come around the non allowable fly zones when calculating the lowest allowable flight altitude.

14 Claims, 7 Drawing Sheets

TERMINATION SECURED ROUTE PLANNING

CROSS-REFERENCE TO RELATED APPLICATIONS

This application claims priority to European patent application 06116479.4 filed 30 Jun. 2006.

FIELD OF THE INVENTION

The invention relates to the field of aircraft navigation, in particular to a so called calculated safe termination operation volume. It also relates to a method of forming such a volume, and an aircraft provided with a system using such a volume to plan a flight route and/or an emergency route.

BACKGROUND OF THE INVENTION

Within a couple of years Unmanned Aerial Vehicles, UAVs, are predicted to fly in civil aerial territory together with civil aeroplanes and according to civil air traffic rules. This will call for very high requirements of security of the systems of an UAV relative third party, both in the air as well as on the ground. For a third party in the air, anti-collision systems and the likes will be available to secure that the safety is met in the air and similar systems will be available to avoid that the vehicle should collide with the ground. However, trouble arises when propulsion of the vehicle ceases to work, and the vehicle is unable to avoid terminating on the ground.

Today the unmanned aerial vehicles operate entirely in designated areas wherein they are allowed to terminate on the ground. To meet the requirements of security for flying in non-designated areas, civil aerial territories, the vehicle must be able to control that it terminates within allowable areas wherein no danger for third parties exist.

Today, UAVs, either remotely piloted vehicles (RPVs) or semi- or fully autonomous, represent an increasingly important field of aircraft technology. When flying autonomous aerial vehicles it is of utter importance to secure in the route planning that the aerial vehicle will be able to reach an approved termination point. If a failure occurs in the UAV, such as engine failure or the like, the UAV must terminate the flight at an approved termination point having an acceptable terrain. Above all, it is necessary to fully exclude the risk of terminating or crashing the UAV in populated areas. This can be achieved by using termination points, wherein these points are predetermined as acceptable points. It is also important as stated above that the UAV is able to reach one of its termination point and that this is secured.

Safety critical system of an UAV should always determine that no danger is present to a third party. These systems require that the vehicle can fly in a normal manner. If an engine failure occurs in an unmanned vehicle a termination to the ground is inevitable, which means that in order to secure the safety of third parties the vehicle must terminate on a predetermined and safe spot.

Document DE, A1, 3124553 discloses a glide path calculation wherein necessary altitude is computed based on the lift and drag ratio to reach a target area.

Document US, A, U.S. Pat. No. 5,142,480 discloses a method to provide an indication if an aircraft can safely glide to a selected airport and display required data, such as required altitude, a predetermined number of airports etc.

Document US, A1, 20040193334 discloses a method of providing a termination route to a vehicle when an emergency situation occurs. The aircraft follows a termination path towards a termination point with a specific altitude and speed.

To enable safe termination in a non-designated area the following are required:

At least one point or area where safe termination is allowed must exist.

The vehicle must always know which termination point it should transfer to, in order to terminate safely.

The vehicle must always be in a position whereat the vehicle can glide to said point or area.

Additionally, safety critical systems, such as positioning systems, control systems must also work in order to enable navigation to the termination point.

The objective of the present invention is to provide an estimated safe termination operation volume wherein each coordinate in the volume fulfils the requirements to provide a safe glide path to an approved termination point which volume can be used to plan a flight route and a termination route in case of emergency.

SUMMARY OF THE INVENTION

The invention provides a method for estimating a safe termination operation volume for an unmanned vehicle that enables safe flight in non designated areas, i.e. areas that are not sealed off explicitly for the military. The method is devised to be fully predictable, which means that the operation of the vehicle can be predicted even if communication or contact with the vehicle is interrupted. The safe termination operation volume may be used as a limiting parameter when planning a regular route, whereas an unmanned vehicle according to the invention, is devised to never plan a route that is not safe. The method can also be used in vehicles controlled by a pilot wherein parameters of the safe termination operation volume may be displayed to the pilot.

The objective of the invention is fulfilled by providing a method for creating a representation of a safe termination operation volume indicating the lowest allowable flight altitude to achieve a glide path of a vehicle to a termination point of an area of interest. The method comprises the step of taking non allowable fly zones into consideration by adding flight altitude to come around said non allowable fly zones when calculating the lowest allowable flight altitude.

In a further aspect the method includes the steps of; discretising the area of interest into discretised areas; inputting data concerning No fly zones and Lift and Drag ratio; selecting at least one point defining a termination point; computing the lowest allowable flight altitude for points adjacent to the point defining the termination point, wherein the lowest allowable flight altitude is computed to admit gliding of the vehicle to the lowest allowable flight altitude of the point defining a termination point; repeating the computing of the lowest allowable flight altitude for point adjacent to the point previously computed, wherein the lowest allowable flight altitude is computed to admit gliding of the vehicle to the lowest allowable flight altitude of the previously computed point; and repeating steps d-e for all selected termination points until all points of the discretised area has received a lowest allowable flight altitude, resulting in a bottom surface of a safe termination operation volume.

In addition the step of inputting data further comprises; adding actual ground terrain data that are considered when calculating the safe termination operation volume.

The invention further discloses a representation of a safe termination operation volume created according to the above stated method.

Additionally, the invention relates to a method for planning a flight route using said safe termination operation volume and that the altitude of the flight plan is determined to never fall below the lowest allowable altitude according to the safe termination operation volume.

The invention further relates to a method for producing a termination map using said safe termination operation volume characterised in that said method further comprises the steps of; discretising the map into areas; and determining for each of said discretised areas an altitude from said safe termination operation volume and a vector indicating the direction a vehicle should travel in order to reach a safe termination point.

Additionally, the invention relates to a method for planning an emergency route of a vehicle when failure occurs in the vehicle resulting in that the vehicle can not complete its predetermined route in an area of interest including the following steps; receiving an indication that failure has occurred; positioning the vehicle; determining control parameters, controlling the vehicle to move in accordance to the determined control parameters; characterized in that said method makes use of a safe termination operation volume mentioned above and in that said control parameters include an altitude read from said safe termination operation volume indicating lowest allowable flight altitude to achieve glide path to a termination point, and a direction read from vectors pointing in the direction towards the termination point.

The method further discloses a method wherein the step of determining the control parameters further includes selecting a safe termination operation volume indicating lowest allowable flight altitude and a direction based on what kind of failure has occurred and is indicated.

Additionally, the step of determining the control parameters further includes selecting a safe termination operation volume indicating lowest allowable flight altitude and a direction based on an indication of the direction the vehicle is travelling.

The invention discloses a control system useable for an unmanned vehicle comprising: a functional monitoring system that receives indications when failure occurs; a positioning unit that can position the vehicle with positioning information; a central processing unit that determines control parameters; and a flight control system that comprises: a main mission control sub system adapted to control the movement of the unmanned vehicle according to a predefined route wherein the control parameters have been taken into account; and an emergency control sub system adapted to control the movement of the unmanned vehicle according to the control parameters received from the central processing unit; in that said control parameters include, an altitude read from a safe termination operation volume mentioned above indicating lowest allowable flight altitude to achieve glide path to the termination point.

Additionally, the control parameters of said method further include a direction read from a map of vectors pointing in the direction towards the termination point based on the position received from the positioning unit when a failure is indicated by the functional monitoring system.

The control system may further comprise memory storage in order to store safe termination operation volumes indicating lowest allowable flight altitude to achieve glide path to the termination point, and a plurality of maps with vectors pointing in the direction towards the termination point.

The invention relates also to a computer program product that when executed on a computer executes a method of creating a safe termination operation volume as mentioned above.

Finally the invention discloses a data structure useable as a precaution plan and as an emergency flight plan onboard an aircraft characterized in that said data structure comprises a number of records, each record corresponding to a limited geographical area, and the records together covering an area of interest for an aircraft having a mission, each record capable of holding data representative of a recommended lowest allowable flight altitude for non-emergency conditions, and also capable of holding data representative of a recommended flight direction for emergency conditions, wherein at least one no allowable fly zone has been taken into consideration and thereby adding flight altitude to the lowest allowable flight altitude to come around said at least one non allowable fly zone.

The data structure is realised as two separate memory entities, one holding the lowest allowable flight altitude and one holding emergency flight direction information.

BRIEF DESCRIPTION OF THE DRAWINGS

The invention will be described in more detail below with reference to preferred examples of embodiments and with reference to the attached drawings, of which

DETAILED DESCRIPTION OF EMBODIMENTS OF THE INVENTION

Definitions area of calculated discretised points—an area wherein lowest allowable altitude for each point of the area is calculated.

area of interest—an area wherein a mission shall be executed or wherein an UAV shall fly; also called operation area.

discretised point—a point in an area of interest, whereas the area of interest has been divided into, e.g. coordinates, points, cells or the likes.

emergency control subsystem—a system for piloting a vehicle during emergency conditions.

"lowest allowable altitude", designated "LAA"—the lowest allowable flight altitude that enables the vehicle to glide to an approved and preferred predetermined termination point.

main mission control sub system—a system for a vehicle responsible for, during regular conditions, mission control including piloting of the vehicle as opposed to "emergency control subsystem"

main mission requirements—parameters defining the purpose and objects of a mission, can be e.g. to follow a flight route, or follow a target with the aid of sensors.

map—a reduced, schematic representation of a geographical area. Also used to denote an electronic representation of a geographical area or of parameters corresponding to geographical positions.

positioning—defines the act of determining a position of an object e.g. defining/determining a longitude, a latitude, and/or an altitude of the object.

positioning unit—a unit able to provide a position for a vehicle. Said unit may use e.g. global positioning system (GPS) or inertial navigation techniques.

safe termination operation volume—a volume that is limited mainly by a lower area defining a space extending vertically above said area, which lower area is indicated by the lowest allowable flight altitude, in discretised points, a vehicle must have in order to reach a safe termination point; and a boundary line.

termination point—a position where it is deemed acceptable to land or crash an aerial vehicle.

In order to be able to calculate the safe operation volume relating to safe termination certain data is needed. This data is called background data. An alteration in this data requires that the safe operation volume is recalculated. Such background data may be; lift and drag ratio of the vehicle, terrain, operation area, termination area, no fly zones or the likes.

Figure 1:
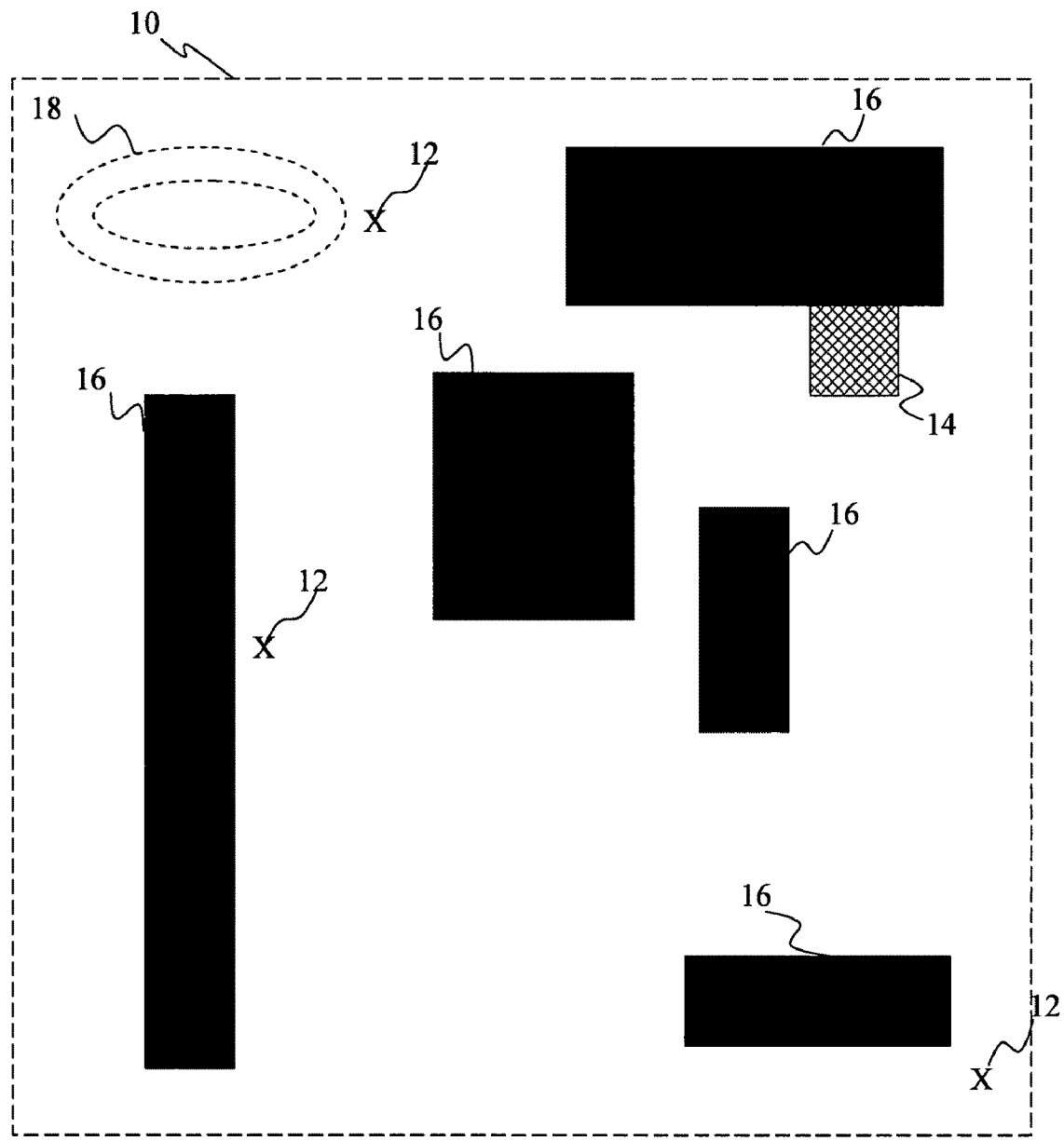
FIG. 1 shows a diagrammatic representation of an area of interest provided with relevant background data.

Referring to FIG. 1, an area of interest 10 is shown including background data. In order to calculate a safe termination operation volume in the area of interest these background data is determined. In the illustrated example the background data has been marked, wherein termination points, Tps, are marked with an X (12), a termination area is marked as a chequered area 14, no flying zones are marked as darkened areas 16, and the elevation of the terrain has been marked with contour lines 18. A vehicle is not allowed to pass over a no fly zone and such a no fly zone should not surround an area where it is allowed to fly, since a vehicle that in some way ends up in a surrounded area would not be able to escape from that position. In the illustrated example all objects have a rectangular shape but it should be understood that the shapes of the objects and points may be in any form.

Figure 2:
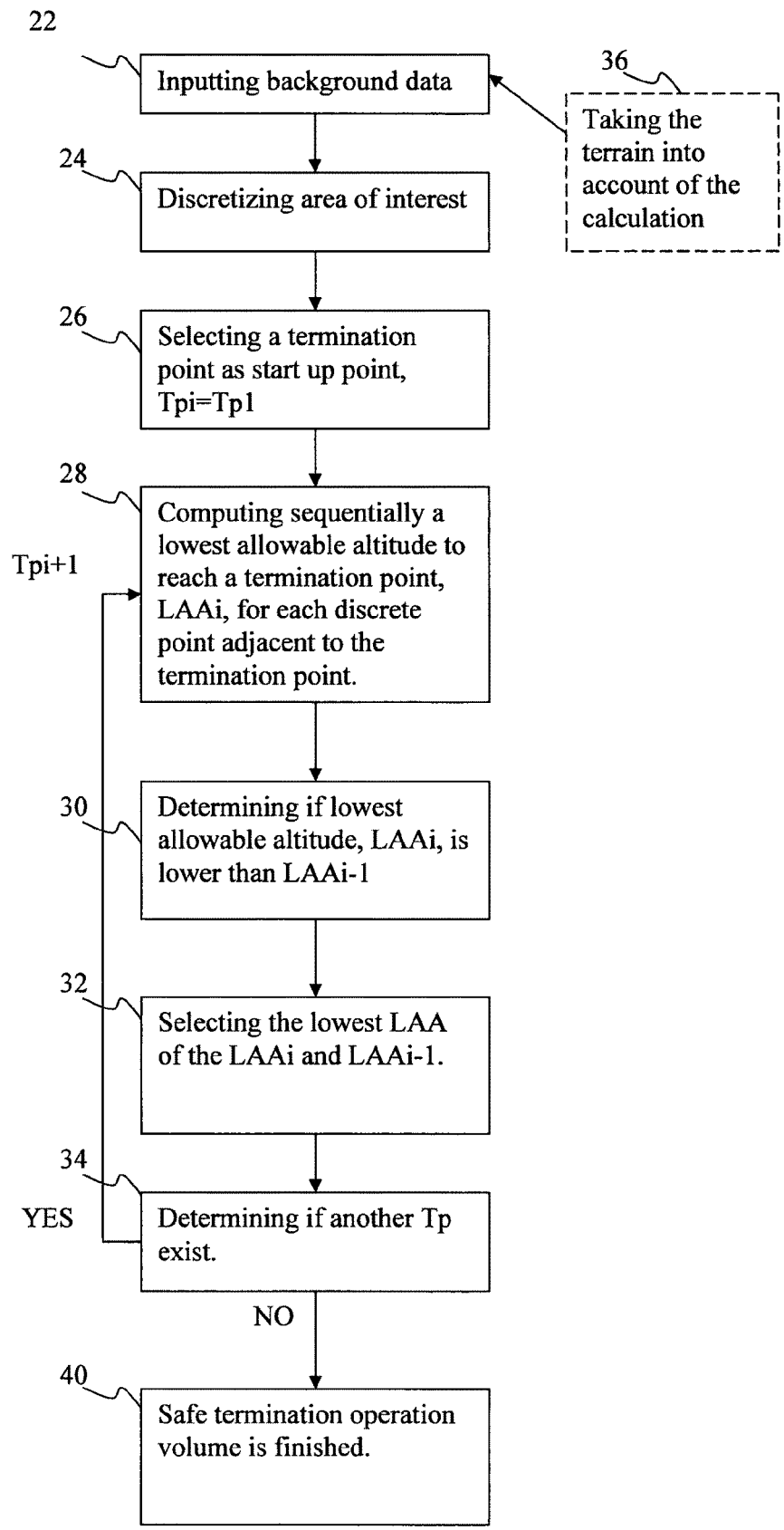
FIG. 2 shows a flowchart of a method of determining a safe termination operation volume according to an embodiment of the invention.

Referring to FIG. 2, wherein the method of making a safe termination operation volume for a vehicle is shown in a schematic block diagram. First, denoted as 22, the background data of an area of interest, as stated above, is provided, which is needed in order to compute the safe termination operation volume. In step 24, the area of interest, also called operation area, is discretised in order to facilitate the computation. The more the area is discretised, i.e. divided into smaller areas, the more accurate is the safe termination operation volume computed. In an embodiment of the invention the area of interest is discretised into latitude and longitude coordinates, forming discretised points. Following the discretising operation 24 is the selection 26 of a first termination point as a start up point in order to start calculating a lowest allowable altitude for the vehicle to be able to reach a termination point. In one embodiment of the invention, the computation is done using Dijkstras search algorithm, which is a standardized algorithm to find the shortest paths from a single source vertex to another predefined vertex in a weighted, directed graph. The search is exhaustive and thus all vertices will be visited if no target vertex is specified. For every discretised point the algorithm determines an altitude, the altitude is increased for the subsequent discretised point in order to allow the vehicle to glide from one point to the other, i.e. from the current discretised point to the previously processed discretised point, see step 28. Thereby, a guaranteed path to a termination point can be provided from all the discretised points in the area of interest. The computation is thoroughly executed in a sequential manner from every termination point in the area of interest. The algorithm is not allowed to enter a no fly zone and therefore the algorithm will find and generate routes around the no fly zones. Consequently, this results in a greater lowest allowable altitude that the vehicle should achieve in order to come around such a no fly zone.

Figure 3:
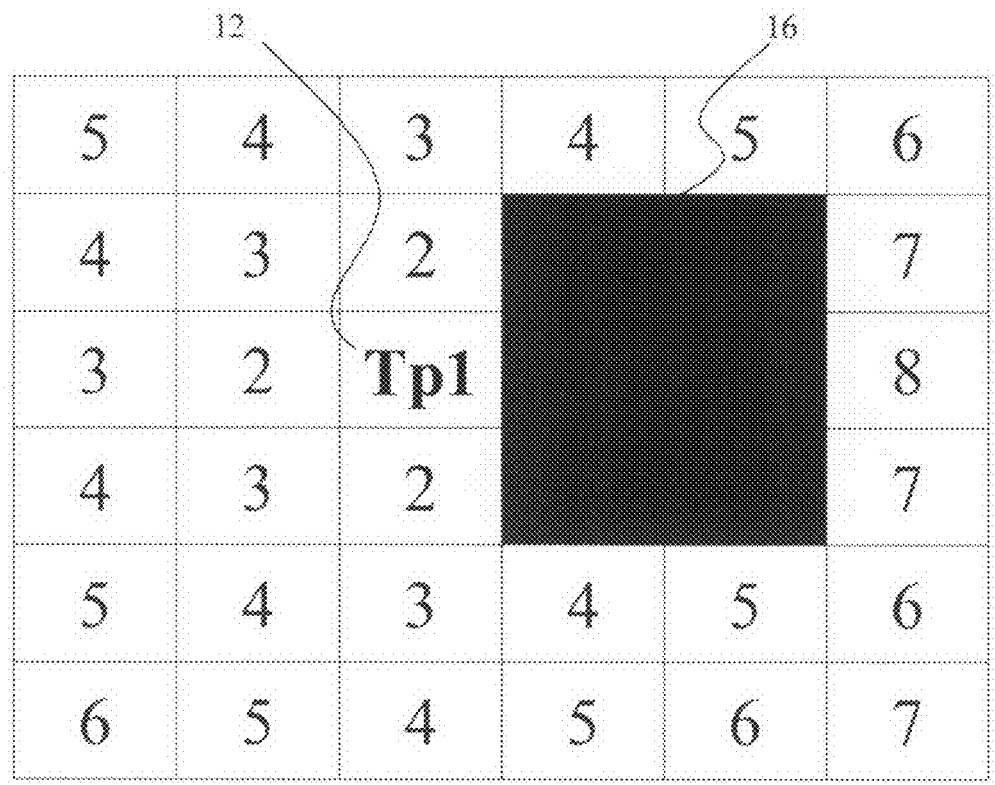
FIG. 3 shows an area of calculated discretised points of a first termination point.
Figure 4:
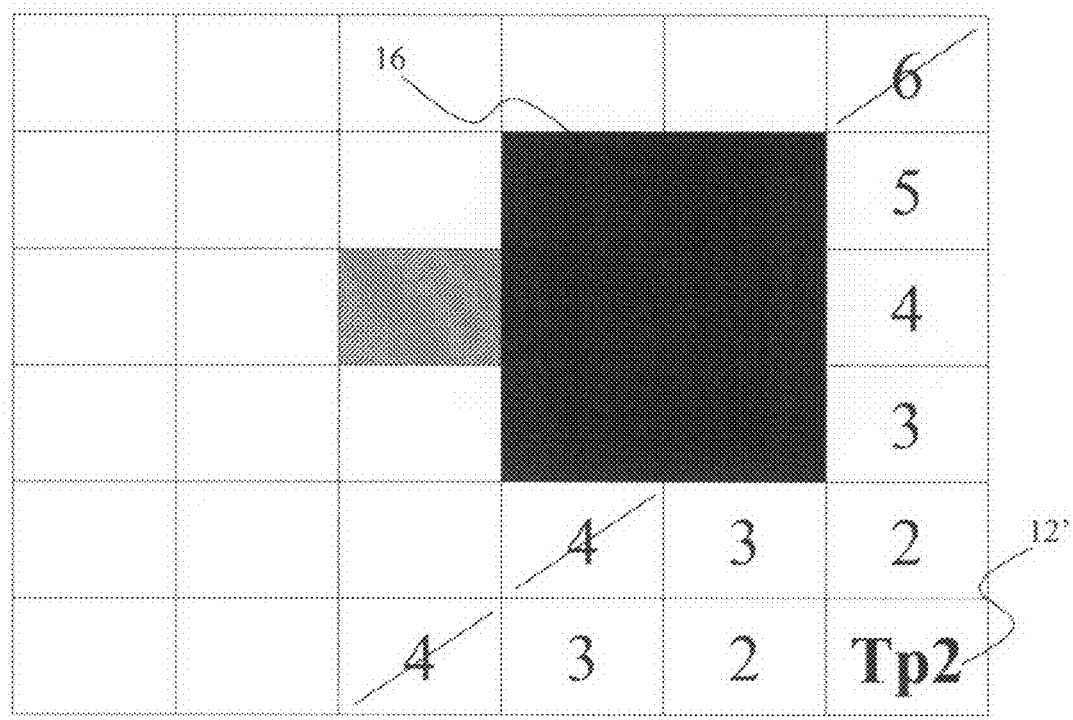
FIG. 4 shows an area of calculated discretised points of a second termination point.

For the processing of a first termination point all discrete points of the area of interest is calculated in order to guarantee that all points in the area of interest have received a termination point. When searching the termination path to the subsequent termination points the search algorithm is carried out as long as the altitude of the calculated point is lower than the altitude related to the previously calculated termination points, step 30-32. When this is not the case the calculation should be ended and in this manner the area of calculated discretised points for each termination point to find the lowest altitude is subsequently reduced. This is illustrated in FIGS. 3 and 4, wherein FIG. 3 a first termination point, Tp1, 12 is set as a start up point and the adjacent points to the Tp1 are processed and provided with a lowest allowable altitude, LAA, to reach the Tp1. In the simplified illustrated example according to FIGS. 3 and 4, the altitude of each discretised point is set as an integer. Where a vehicle has to fly diagonally to reach the Tp, the LAA of such a point is set an integer higher than if the vehicle could fly orthogonally through the discretised point. As is shown in FIG. 3, the LAA is calculated and influenced by the no fly zone 16, which results in a much higher LAA at discretised points behind the no fly zone 16 in order to be able to fly around the non fly zone.

The computation then continues with the next termination point Tp2 12', as illustrated in FIG. 4, wherein LAA for each discretised point is calculated to reach Tp2. Processing of dicretised points starts with the points closest to the current termination point (Tp2) and continues with points farther and farther away. Further discretised points are processed only as long as the computed LAA is lower than the previously computed LAA related to the previous termination point Tp1 12. This reduces the amount of points, the calculation area, for every following termination point, which results in a more rapid calculation.

Referring back to FIG. 2, after the LAA is calculated and set for each discretised point of a calculation related to one termination point, it is determined if another termination point exist, step 34. If one exists, the computation is performed for that termination point in order to establish LAAs related to that termination point. If one does not exist, the computation is ended and the result is a safe termination operation volume wherein the data of LAA represent the bottom surface of the volume.

It should be understood that if there exist, in the area of interest, a highest allowed altitude, certain points may be calculated with an altitude that exceeds the highest allowed altitude. Hence, these points become no fly zones, wherein the vehicle is not allowed to fly through.

Figure 5:
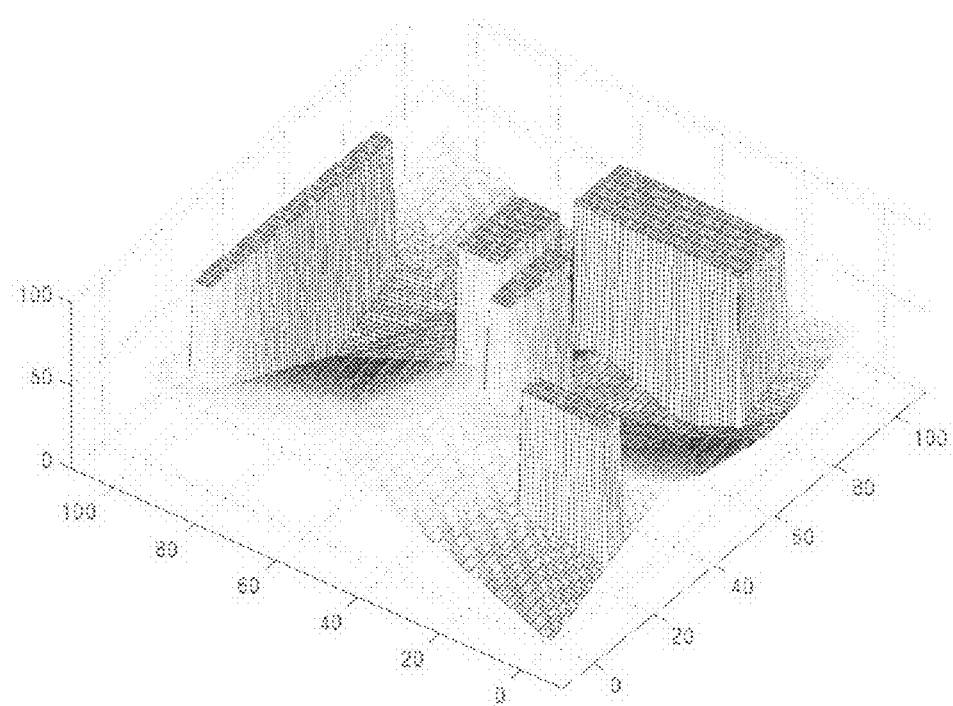
FIG. 5 shows an example of a safe termination operation volume without the terrain taken into consideration.

Referring to FIG. 5, a calculation of the flight altitude in an area of interest is shown. This flight altitude is the lowest allowable altitude, LAA, the vehicle must have in order to reach a termination point. In order to obtain the final safe termination operation volume the data indicating the lowest allowable altitude obtained from the glide path calculation is put together with the actual terrain by adding the highest point of each point to the virtual value of the glide calculation (Max(Terrain, Glide Altitude)). In an embodiment of the invention the calculation of adding the different altitudes is done during the search algorithm and thereby the search algorithm takes the actual terrain into account, see step 36 in FIG. 2. By including the terrain, which means that the altitude for a discretised point must be able to glide to the previously calculated points' altitude as well as having a certain distance to the actual ground. The result of taking the actual terrain into account is that, if the actual terrain, with or without a predetermined safety margin, exceeds the LAA relating to a previously calculated discretised point the LAA is determined to the altitude of the actual terrain with a safety margin. In some cases the actual terrain will cause a great increase in the LAA, such cases may be a hill or the like. When a hill is taken into account the LAA over the hill will be affected greatly, however, a discretised point behind a hill may have a LAA that is lower than the LAA of the hill, even if the hill is closer the termination point. This will be the case when algorithm determines that the vehicle can fly around the hill, which generates a higher LAA than if no hill was present but a lower LAA than if the vehicle have to fly over the hill. Hence, the calculations, wherein the actual terrain is taken into account, will increase the LAA in order to come around or fly over the protruding terrain, depending on which altitude, to fly over or to fly around, is the lowest in order to reach a termination point.

An exemplary making of a safe termination operation volume will now be described with parameters and computations. Parameters that are used in the described example:

Map: Data of terrain and virtual obstacles, e.g. no fly zones.
V: Valid set of vertices, a vertex being a discretised point
d[u]: LAA in vertex u
p[u]: parent vertex, discretised point of a previously processed discretised point
w(u,v): LAA-delta between vertex u and v, based on the glide slope of the UAV, i.e. the difference in altitude for a UAV to glide from u to v.
Tpi: Selected Termination point i, Tpi is a vertex in V.
F: Priority queue of vertices in search front

```
for each vertex u in V
    d[u] := infinity
    p[u] := u
end for
[Each vertex receives a start up value]
F := Ø
INSERT(F, Tpi)
d[Tpi] := ground altitude at Tpi
p[Tpi] := TPi
while (F != Ø)
    u := EXTRACT-MIN(F)
    for each vertex v in adj[u]
        if (w(u,v) + d[u] < d[v]) and (Map[v] < infinity)
            if (w(u,v) + d[u] < Map[v])
                d[v] := Map[v]
            else
                d[v] := w(u,v) + d[u]
            end if
            p[v] := u
            if (v not in F)
                INSERT(F,v)
            end if
        end if
    end for
    REMOVE(F, u)
end while
```

[Calculation to Determine LAA Resulting in d[V], which is the Safe Termination Operation Volume Floor]

Figure 6:
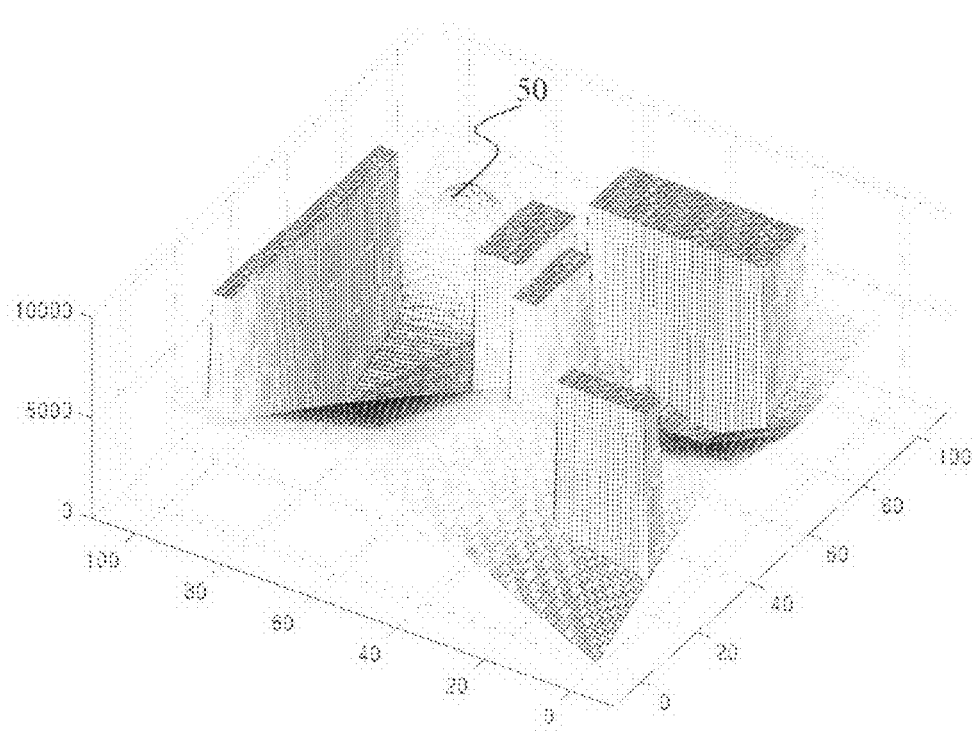
FIG. 6 shows the safe termination operation volume of FIG. 5 wherein the terrain has been taken into consideration.

FIG. 6 discloses an illustrative three dimensional example wherein the terrain and the glide altitude have been taken into consideration in order for a vehicle to reach termination points. FIG. 6 differs from what FIG. 5 discloses in the matter of a Gaussian hill 50 due to the actual terrain consideration.

Figure 7:
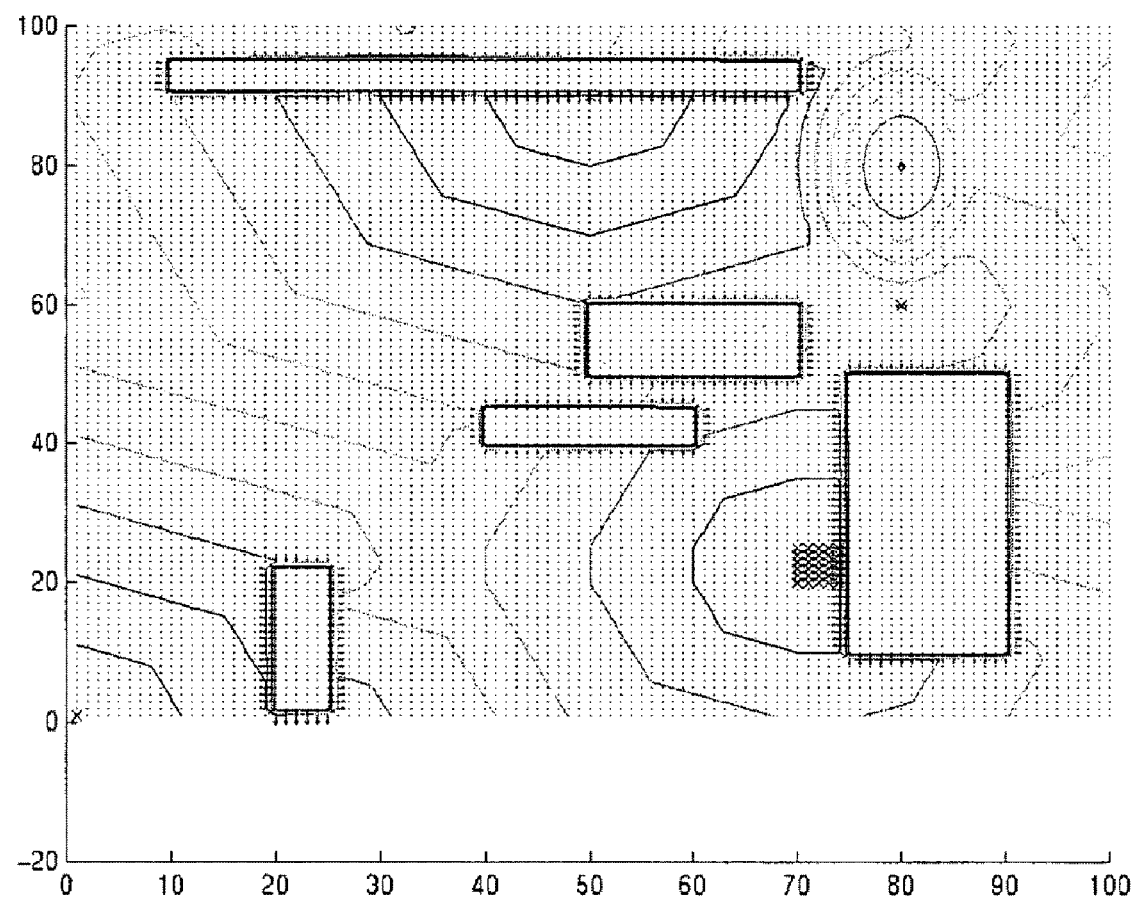
FIG. 7 shows the safe termination operation volume of FIG. 5, illustrated in a 2-dimensional manner.

FIG. 7 discloses the same safe termination operation area as in FIG. 6 but with the difference that the safe termination operation area is illustrated in a two dimensional manner indicating altitudes using contour curves.

Figure 8:
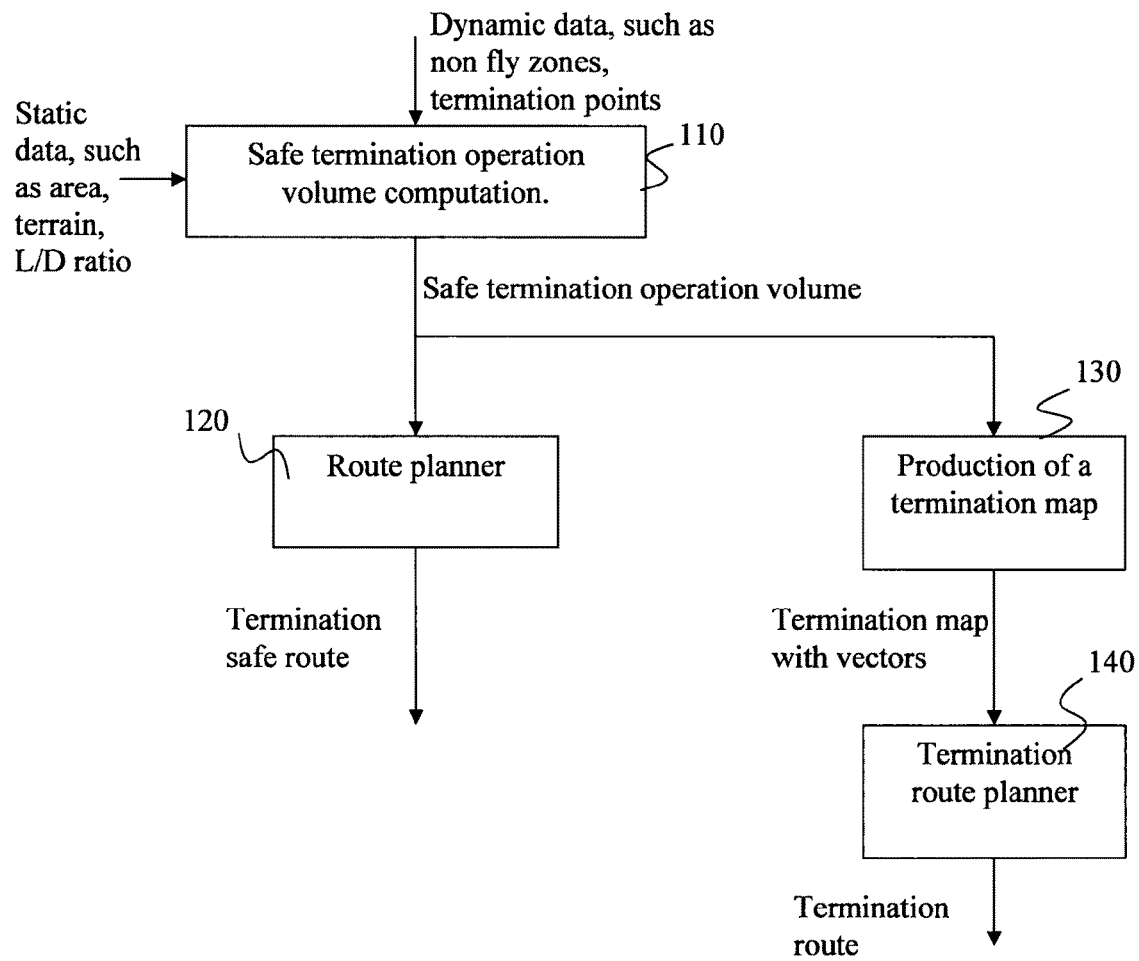
FIG. 8 shows a block diagram of a method for using the safe termination operation volume determined according to the method of FIG. 2.

Referring to FIG. 8, a block diagram schematically shows the use of a safe termination operation volume. Dynamic data, i.e. changeable data, such as a condensed digital representation of no fly zones, termination points etc. defined by e.g. a user by inputting coordinates of the data or the like, as well as static data, such as area of interest, terrain, L/D ratio etc., are put into the computation of the safe termination operation volume, see block 110. The safe termination operation volume, resulting from this computation, as explained above, may be used to plan a route wherein the safe termination operation volume is considered in order to always be able to avoid crashing in inappropriate places such as populated areas etc. This means that a vehicles planned route will never go below a discretised points' LAA. This results in a vehicle with a route planner 120 that produces a termination safe route. The bottom surface of the safe termination operation volume, also considered as a virtual terrain, is used to plan a route in the same way as a terrain profile is taken into consideration to plan a route with the difference that the ground profile has been elevated at certain areas in order to be able to glide to a predetermined termination point.

The result of the safe termination operation volume computation 110 may also be used in the production of a termination map 130, wherein the result is a termination map with vectors that direct the vehicle to a safe termination point. The vectors are pointing towards the termination point which is easiest to reach, i.e. the one used to calculate the lowest allowable altitude. The termination map with the vectors is used if an emergency occurs in the vehicle, such as engine failure, in order to determine a termination route, as stated in block 140.

Figure 9:
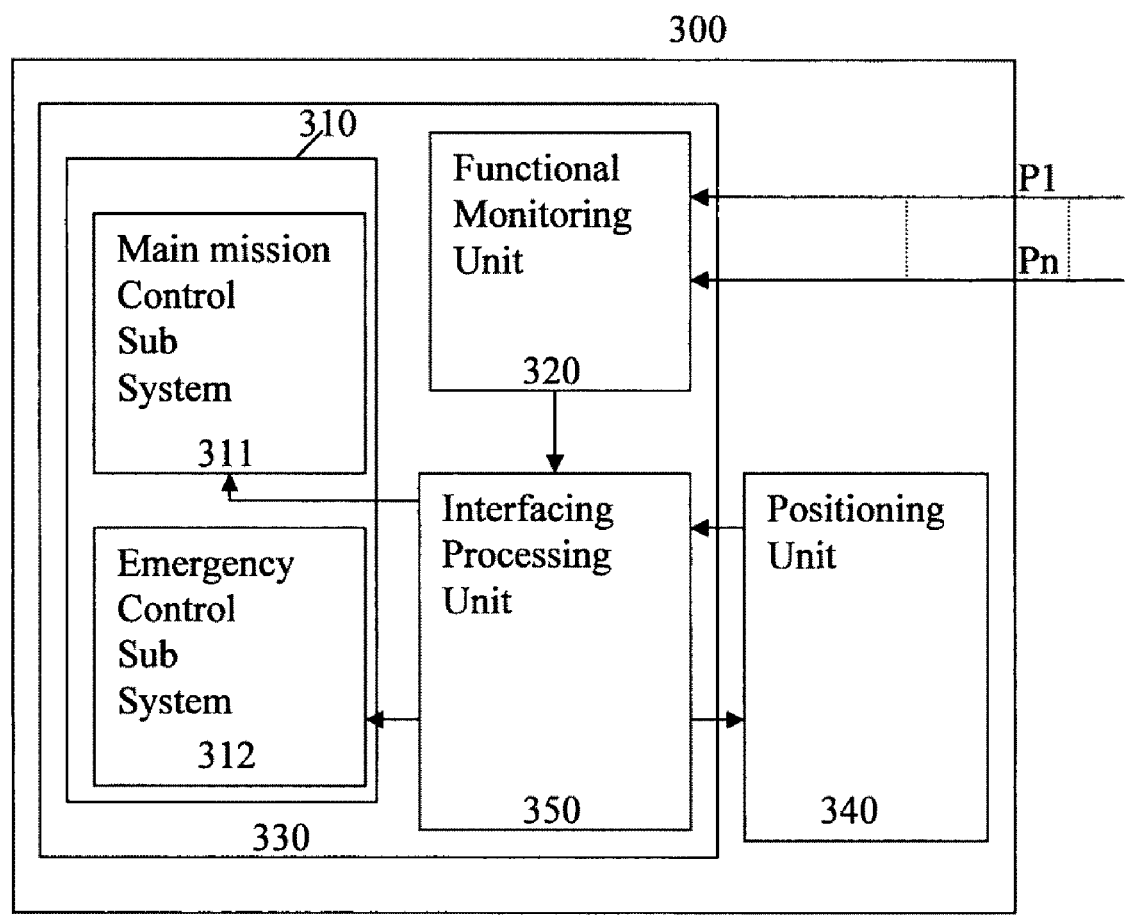
FIG. 9 shows a block diagram of a signalling control system according to an embodiment of the invention.

Referring to FIG. 9, an unmanned vehicle according to an embodiment of the present invention comprises a signalling control system 300 which includes a central processing unit CPU 330 and a positioning unit 340. An on-board flight control system 310, a functional monitoring system 320 and an interfacing processing unit 350 are included in the central processing unit CPU 330. The on-board flight control system 310 contains a main mission control sub system 311 and an emergency control sub system 312. The main mission control sub system 311 is adapted to control the vehicle to move according to main mission requirements and according to data received from the interfacing processing unit 350. The emergency control sub system 312 is adapted to control the vehicle to move according to data collected in the interfacing processing unit from a map of lowest allowable flight altitude, i.e. a map as defined above, that has taken the safe termination operation volume into consideration. On the on-board flight control system may further include an additional control sub system (not shown) that is adapted to control the vehicle to move according to commands received in real time from an operator through an optional wireless interface unit (not shown). The functional monitoring system 320 is adapted to monitor a set of flight control parameters P1-Pn. In case any of these parameters P1-Pn falls outside an acceptable range, the functional monitoring system 320 sets a relevant alarm condition, e.g. "engine failure". Through the positioning unit 340 the position of the vehicle is received or calculated, through such as Global positioning system, GPS, inertial navigation system, INS or the like.

The interfacing processing unit 350 uses this information of position from the positioning unit 340 and the fact that engine failure has occurred in order to produce an emergency route for the vehicle to adapt, e.g. coordinates for the vehicle to follow. The interfacing processing unit 350 has access to digital representation of safe termination operation volumes or termination maps calculated from the safe termination operation volume either through a separated memory (not shown) or a memory integrated in the interfacing processing unit 350. From the information of position the interfacing processing unit 350 determines a discretised point identification. From this point identification the lowest allowable flight altitude, LAA, can be read as well as what direction the vehicle should take in order to crash/land in a predetermined termination point according to the safe termination operation volume and a map of vectors computed in before hand. This information is then transferred to the secondary control sub system that guides the vehicle in accordance to said information. It should be understood that different emergency conditions may require different computed termination maps and therefore, the control system of a vehicle may comprise a plurality of termination maps based on conditions reported from the functional monitoring system 320.

The safe termination operation volume calculation containing LAA received from the memory should also be used during a flight when no emergency has occurred in order to always be at a flight altitude according to LAA if an emergency should occur, i.e. the data from the safe termination operation volume is also used in the main mission control sub system 311 during flight when no emergency has occurred, as explained above.

The information, the safe termination operation volume, that the system has calculated as well as the background data used in the calculation, such as lift and drag ratio, L/D ratio, no fly zones etc., are all stored in the vehicle in order for the vehicle to use the information during normal flight as well as during an emergency.

Due to the relevance of this information this information should be taken into consideration into the security aspect of designing the system of the vehicle. The storage of data should have a security class corresponding to a database of a ground collision warning system. If a recalculation of the safe termination operation volume during a flight could be necessary and doable, this system should as well have a high security class. In an embodiment data storage is of a high security class.

Instead of producing a virtual terrain based on the lift and drag ratio, a virtual terrain based on the vehicle ability to reflect/receive radio waves may be produced. This virtual terrain would instead of disclosing a safe termination operation volume disclose a safe communication operation volume, wherein the vehicle always would be able to communicate; or a safe non detecting operation volume wherein the vehicle would always be out of reach for known radio stations and intercepting stations.

The invention provides a method for determining a safe termination operation volume for an unmanned vehicle that enables safe flight in non designated areas. The method is devised to be fully predictable, which means that the operation of the vehicle can be predicted even if communication/contact with the vehicle is interrupted. The safe termination operation volume may be used as a limiting parameter when planning a regular route, whereas the unmanned vehicle never plans a route that is not safe. The method can also be used in vehicles controlled by a pilot wherein parameters of the safe termination operation volume may be displayed to the pilot.

The invention claimed is:

1. A method for creating a representation of a safe termination operation volume indicating a lowest allowable flight altitude to achieve a glide path of a vehicle to a termination point of an area of interest, the method comprising:
    taking non allowable fly zones into consideration by adding flight altitude to come around said non allowable fly zones when calculating the lowest allowable flight altitude;
    discretising the area of interest into discretised areas;
    inputting data concerning No fly zones and Lift and Drag ratio;
    selecting at least one point defining a termination point;
    computing the lowest allowable flight altitude for points adjacent to the point defining the termination point, wherein the lowest allowable flight altitude is computed to admit gliding of the vehicle to the lowest allowable flight altitude of the point defining a termination point;
    repeating the computing of the lowest allowable flight altitude for point adjacent to the point previously computed, wherein the lowest allowable flight altitude is computed to admit gliding of the vehicle to the lowest allowable flight altitude of the previously computed point; and
    repeating the computing and repeating the computing for all selected termination points until all points of the discretised area have received a lowest allowable flight altitude, resulting in a bottom surface of a safe termination operation volume.

2. The method according to claim 1, wherein inputting data further comprises;
    adding actual ground terrain data that are considered when calculating the safe termination operation volume.

3. A representation of a safe termination operation volume created according to the method of claim 1.

4. A method for planning a flight route using a safe termination operation volume according to claim 3, wherein the altitude of the flight plan is determined to never fall below the lowest allowable altitude according to the safe termination operation volume.

5. The method for producing a termination map using a safe termination operation volume according to claim 3 further comprising:
    discretising the map into areas; and
    determining for each of said discretised areas an altitude from said safe termination operation volume and a vector indicating the direction a vehicle should travel in order to reach a safe termination point.

6. A method for planning an emergency route of a vehicle when failure occurs in the vehicle resulting in that the vehicle can not complete its predetermined route in an area of interest, the method comprising:
    receiving an indication that failure has occurred;
    positioning the vehicle;
    determining control parameters;
    controlling the vehicle to move in accordance to the determined control parameters;
    wherein said method makes use of a safe termination operation volume according to claim 5, and wherein said control parameters include an altitude read from said safe termination operation volume indicating lowest allowable flight altitude to achieve glide path to a termination point, and a direction read from vectors pointing in the direction towards the termination point.

7. The method according to claim 6, wherein determining the control parameters further comprises selecting a safe termination operation volume indicating lowest allowable flight altitude and a direction based on what kind of failure has occurred and is indicated.

8. The method according to claim 6, wherein determining the control parameters further comprises selecting a safe termination operation volume indicating lowest allowable flight altitude and a direction based on an indication of the direction the vehicle is travelling.

9. A control system useable for an unmanned vehicle comprising:
   a functional monitoring system that receives indications when failure occurs;
   a positioning unit that can position the vehicle with positioning information;
   a central processing unit that determines control parameters; and
   a flight control system comprising:
   a main mission control sub system adapted to control the movement of the unmanned vehicle according to a predefined route wherein the control parameters have been taken into account; and
   an emergency control sub system adapted to control the movement of the unmanned vehicle according to the control parameters received from the central processing unit;
   wherein said control parameters include, an altitude read from a safe termination operation volume according to claim 5 indicating lowest allowable flight altitude to achieve glide path to the termination point.

10. The control system according to claim 9, wherein the control parameters further comprise a direction read from a map of vectors pointing in the direction towards the termination point based on the position received from the positioning unit when a failure is indicated by the functional monitoring system.

11. The control system according to claim 9, further comprising:
    memory storage in order to store safe termination operation volumes indicating lowest allowable flight altitude to achieve glide path to the termination point, and a plurality of maps with vectors pointing in the direction towards the termination point.

12. A data structure useable as a precaution plan and as an emergency flight plan onboard an aircraft, which precaution plan and emergency flight plan uses the representation of a safe termination operation volume according to claim 1, comprising:
    a number of records, each record corresponding to a limited geographical area, and the records together covering an area of interest for an aircraft having a mission, each record capable of holding data representative of a recommended lowest allowable flight altitude for non-emergency conditions, and also capable of holding data representative of a recommended flight direction for emergency conditions, wherein at least one no allowable fly zone has been taken into consideration and thereby adding flight altitude to the lowest allowable flight altitude to come around said at least one non allowable fly zone.

13. The data structure according to claim 12, where the data base structure is realised as two separate memory entities, one holding the lowest allowable flight altitude and one holding emergency flight direction information.

14. A computer program product, comprising:
    a computer readable medium; and
    computer program instructions recorded on the computer readable medium and executable by a computer to carry out a method of creating a safe termination operation volume comprising taking non allowable fly zones into consideration by adding flight altitude to come around said non allowable fly zones when calculating the lowest allowable flight altitude, discretising the area of interest into discretised areas, inputting data concerning No fly zones and Lift and Drag ratio, selecting at least one point defining a termination point, computing the lowest allowable flight altitude for points adjacent to the point defining the termination point, wherein the lowest allowable flight altitude is computed to admit gliding of the vehicle to the lowest allowable flight altitude of the point defining a termination point, repeating the computing of the lowest allowable flight altitude for point adjacent to the point previously computed, wherein the lowest allowable flight altitude is computed to admit gliding of the vehicle to the lowest allowable flight altitude of the previously computed point, and repeating the computing and repeating the computing for all selected termination points until all points of the discretised area have received a lowest allowable flight altitude, resulting in a bottom surface of a safe termination operation volume.

* * * * *